(12) United States Patent
Akkarakaran et al.

(10) Patent No.: US 11,871,387 B2
(45) Date of Patent: *Jan. 9, 2024

(54) TECHNIQUES AND APPARATUSES FOR VARIABLE TIMING ADJUSTMENT GRANULARITY

(71) Applicant: QUALCOMM Incorporated, San Diego, CA (US)

(72) Inventors: Sony Akkarakaran, Poway, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

This patent is subject to a terminal disclaimer.

(21) Appl. No.: 17/303,742

(22) Filed: Jun. 7, 2021

(65) Prior Publication Data

US 2021/0298014 A1 Sep. 23, 2021

Related U.S. Application Data

(63) Continuation of application No. 16/058,765, filed on Aug. 8, 2018, now Pat. No. 11,032,816.

(Continued)

(51) Int. Cl.
*H04W 4/00* (2018.01)
*H04W 72/0446* (2023.01)
(Continued)

(52) U.S. Cl.
CPC ... *H04W 72/0446* (2013.01); *H04W 56/0045* (2013.01); *H04W 72/02* (2013.01);
(Continued)

(58) Field of Classification Search
None
See application file for complete search history.

(56) References Cited

U.S. PATENT DOCUMENTS

| 11,032,816 B2 | 6/2021 | Akkarakaran et al. |
| 11,240,774 B2 | 2/2022 | Wang et al. |

(Continued)

FOREIGN PATENT DOCUMENTS

| CN | 102256356 A | 11/2011 |
| CN | 102740447 A | 10/2012 |

(Continued)

OTHER PUBLICATIONS

Ericsson: "Requirements for NR UE Timing Advance", 3GPP Draft; R4-1706716, 3rd Generation Partnership Project (3GPP), Mobile Competence Centre ; 650, Route Des Lucioles ; F-06921 Sophia-antipolis Cedex ; France vol. RAN WG4. No. Qingdao, China; Jun. 27, 2017-Jun. 29, 2017, Jun. 26, 2017, XP051302759, Retrieved from the Internet: URL:http://www.3gpp.org/ftp/Meetings_3GPP_SYNC/RAN4/Docs/ [retrieved on Jun. 26, 2017], 4 pages.

(Continued)

*Primary Examiner* — Bob A Phunkulh
(74) *Attorney, Agent, or Firm* — Harrity & Harrity, LLP

(57) ABSTRACT

Certain aspects of the present disclosure generally relate to wireless communication. In some aspects, a user equipment may determine at least one of a granularity or range of a timing adjustment value based at least in part on at least one of a timing adjustment command indicating the granularity, configuration information indicating the granularity, information regarding a communication, carrier, or band associated with the user equipment, or a combination thereof; and/or perform timing adjustment based at least in part on at least one of the granularity or the range of the timing adjustment value. Numerous other aspects are provided.

32 Claims, 8 Drawing Sheets

Related U.S. Application Data

(60) Provisional application No. 62/543,653, filed on Aug. 10, 2017.

(51) Int. Cl.

| | | |
|---|---|---|
| *H04W 56/00* | (2009.01) | |
| *H04W 72/23* | (2023.01) | |
| *H04W 72/02* | (2009.01) | |
| *H04W 72/0453* | (2023.01) | |
| *H04L 27/26* | (2006.01) | |
| *H04W 88/02* | (2009.01) | |

(52) U.S. Cl.
CPC ....... *H04W 72/0453* (2013.01); *H04W 72/23* (2023.01); *H04L 27/26025* (2021.01); *H04W 88/02* (2013.01)

(56) References Cited

U.S. PATENT DOCUMENTS

| | | | |
|---|---|---|---|
| 2011/0158116 | A1 | 6/2011 | Tenny et al. |
| 2012/0063425 | A1 | 3/2012 | Wang et al. |
| 2012/0281682 | A1 | 11/2012 | Chin et al. |
| 2013/0028204 | A1 | 1/2013 | Dinan |
| 2013/0188473 | A1 | 7/2013 | Dinan |
| 2013/0215874 | A1 | 8/2013 | Yang et al. |
| 2013/0258882 | A1 | 10/2013 | Dinan |
| 2013/0272233 | A1 | 10/2013 | Dinan |
| 2013/0279433 | A1 | 10/2013 | Dinan |
| 2013/0336294 | A1 | 12/2013 | Dinan |
| 2013/0343297 | A1 | 12/2013 | Dinan |
| 2014/0274049 | A1 | 9/2014 | Singh et al. |
| 2015/0304891 | A1 | 10/2015 | Dinan |
| 2016/0044666 | A1* | 2/2016 | Shin .............. H04W 56/002 370/336 |
| 2016/0198497 | A1 | 7/2016 | Yu et al. |
| 2017/0111888 | A1 | 4/2017 | Dinan |
| 2017/0111908 | A1 | 4/2017 | Xiong |
| 2018/0035421 | A1 | 2/2018 | Lin et al. |
| 2018/0123848 | A1 | 5/2018 | Nammi et al. |
| 2018/0198548 | A1 | 7/2018 | Nammi et al. |
| 2018/0198579 | A1 | 7/2018 | Nammi et al. |
| 2018/0332605 | A1 | 11/2018 | Pelletier |
| 2019/0208482 | A1 | 7/2019 | Tooher et al. |

FOREIGN PATENT DOCUMENTS

| | | |
|---|---|---|
| CN | 103370972 A | 10/2013 |
| CN | 105532068 A | 4/2016 |
| CN | 105580457 A | 5/2016 |
| CN | 105940735 A | 9/2016 |
| EP | 2557867 A1 | 2/2013 |
| EP | 2750458 A1 | 7/2014 |
| EP | 2916603 A1 | 9/2015 |
| EP | 3151625 A1 | 4/2017 |
| TW | 201440608 A | 10/2014 |
| WO | WO-2014164144 A1 | 10/2014 |
| WO | 2017066803 A1 | 4/2017 |
| WO | 2017079530 A1 | 5/2017 |
| WO | 2017105693 | 6/2017 |

OTHER PUBLICATIONS

International Preliminary Report on Patentability—PCT/US2018/046020, The International Bureau of WIPO—Geneva, Switzerland, dated Feb. 20, 2020.

International Search Report and Written Opinion—PCT/US2018/046020—ISA/EPO—dated Nov. 16, 2018.

Qualcomm Incorporated: "Timing Advance for Different Numerology", 3GPP Draft; R1-1711208 Timing Advance for Different Numerology, 3rd Generation Partnership Project (3GPP), Mobile Competence Centre ; 650, Route Des Lucioles ; F-06921 Sophia-antipolis Cedex ; France vol. RAN WG1, No. Qingdao, China; Jun. 27, 2017-Jun. 30, 2017, Jun. 26, 2017, XP051300407, Retrieved from the Internet:URL:http://www.3gpp.org/ftp/Meetings_3GPP_SYNC/RAN1/Docs/ [retrieved on Jun. 26, 2017], 1 page.

Huawei, et al., "Maximum TA and Processing Time Reduction", 3GPP TSG RAN WG1 #88, R1-1701744, 3GPP, Athens, Greece, Feb. 13, 2017-Feb. 17, 2017, 9 Pages, Feb. 6, 2017.

Qualcomm Incorporated: "NPRACH Support for Large Cell Access", 3GPP TSG RAN WG1 #88-bis, R1-1705020, 3GPP, Spokane, US, Apr. 3, 2017-Apr. 7, 2017, 4 Pages, Mar. 25, 2017.

Qualcomm Incorporated: "PRACH Design Consideration", 3GPP TSG RAN WG1#88bis, R1-1705571, 3GPP, Spokane, US, Apr. 3, 2017-Apr. 7, 2017, 23 Pages, Mar. 25, 2017.

Qualcomm Incorporated: "Random Access Channel Design," 3GPP Draft, 3GPP TSG RAN WG1 Meeting #84, R1-160883, 3rd Generation Partnership Project (3GPP), Mobile Competence Centre; 650, Route Des Lucioles; F-06921, Sophia-Antipolis Cedex; France, vol. RAN WG1, No. St Julian's. Malta, Feb. 15-19, 2016, XP051054207, 4 pages , sect.—2 para 1,2, table 2, Fig.—2,3, Section 2, figures 2,3.

Qualcomm Incorporated: "Random Access Channel Design", 3GPP TSG RAN WG1 adhoc_LTE_NB-IoT_1601, R1-160110, 3GPP, Budapest, Hungary, Jan. 18, 2016-Jan. 20, 2016, 6 Pages, Jan. 12, 2016.

Samsung: "RACH Aspects for CA and DC", 3GPP TSG RAN WG1 adhoc_NR_AH_1706, 3GPP TSG RAN WG1 NR Ad-Hoc#2, R1-1710769, Qingdao, China, Jun. 27, 2017-Jun. 30, 2017, 4 Pages, Jun. 16, 2017.

Alcatei-Lucent, "Discussion of Scell timing advance calculation using time difference measurement", R4-113971, 3GPP TSG-RAN WG4 Meeting #60, Athens , Greece, Aug. 22-26, 2011, Aug. 11, 2011, 5 Pages.

Zhang G.Y., et al., "Power Grid Time Synchronization Method Based on TD-LTE Frame Synchronization", Journal of Beijing University of Posts and Telecommunications, vol. 40, No. 1, Feb. 2017, Feb. 15, 2017, 7 Pages.

Taiwan Search Report—TW107127805—TIPO—dated Dec. 21, 2021.

ERICSSON: "Consideration of Requirements for NR UE Timing Advance", 3GPP TSG-RAN WG4 Meeting #83, R4-1705306, 3rd Generation Partnership Project, Mobile Competence Centre, 650, Route Des Lucioles, F-06921 Sophia Antipolis Cedex, France, vol. RAN WG4, No. Huangzhou, China, May 15, 2017-May 19, 2017, May 14, 2017, 5 Pages, XP051277431, Table 2, 3, Chapters 2.1, 2.2, 2.3 and 2.4, Section 1-3.

* cited by examiner

TECHNIQUES AND APPARATUSES FOR VARIABLE TIMING ADJUSTMENT GRANULARITY

CROSS-REFERENCE TO RELATED APPLICATIONS UNDER 35 U.S.C. § 119

This application is a continuation of U.S. patent application Ser. No. 16/058,765, filed Aug. 8, 2018 (now U.S. Pat. No. 11,032,816), entitled "TECHNIQUES AND APPARATUSES FOR VARIABLE TIMING ADJUSTMENT GRANULARITY," which claims priority to U.S. Provisional Patent Application No. 62/543,653, filed on Aug. 10, 2017, entitled "TECHNIQUES AND APPARATUSES FOR VARIABLE TIMING ADJUSTMENT GRANULARITY," which are hereby expressly incorporated by reference herein.

FIELD OF THE DISCLOSURE

Aspects of the present disclosure generally relate to wireless communication, and more particularly to techniques and apparatuses for variable timing adjustment (TA) granularity.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication performed by a user equipment may include determining at least one of a granularity or range of a timing adjustment value based at least in part on at least one of a timing adjustment command indicating the granularity, configuration information indicating the granularity, information regarding a communication, carrier, or band associated with the user equipment, or a combination thereof, wherein the granularity or the range is variable based at least in part on the communication, carrier, or band associated with the user equipment; and performing timing adjustment based at least in part on at least one of the granularity or the range of the timing adjustment value.

In some aspects, a user equipment for wireless communication may include a memory; and one or more processors, the memory and the one or more processors configured to: determine at least one of a granularity or range of a timing adjustment value based at least in part on at least one of a timing adjustment command indicating the granularity, configuration information indicating the granularity, information regarding a communication, carrier, or band associated with the user equipment, or a combination thereof, wherein the granularity or the range is variable based at least in part on the communication, carrier, or band associated with the user equipment; and perform timing adjustment based at least in part on at least one of the granularity or the range of the timing adjustment value.

In some aspects, a non-transitory computer-readable medium may store one or more instructions for wireless communication. The one or more instructions, when executed by one or more processors of a user equipment, may cause the one or more processors to determine at least one of a granularity or range of a timing adjustment value based at least in part on at least one of a timing adjustment command indicating the granularity, configuration information indicating the granularity, information regarding a communication, carrier, or band associated with the user equipment, or a combination thereof, wherein the granularity or the range is variable based at least in part on the communication, carrier, or band associated with the user equipment; and perform timing adjustment based at least in part on at least one of the granularity or the range of the timing adjustment value.

In some aspects, an apparatus for wireless communication may include means for determining at least one of a granularity or range of a timing adjustment value based at least in part on at least one of a timing adjustment command indicating the granularity, configuration information indicating the granularity, information regarding a communication, carrier, or band associated with the apparatus, or a combination thereof, wherein the granularity or the range is variable based at least in part on the communication, carrier, or band associated with the apparatus; and means for performing timing adjustment based at least in part on at least one of the granularity or the range of the timing adjustment value.

Aspects generally include a method, apparatus, system, computer program product, non-transitory computer-readable medium, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
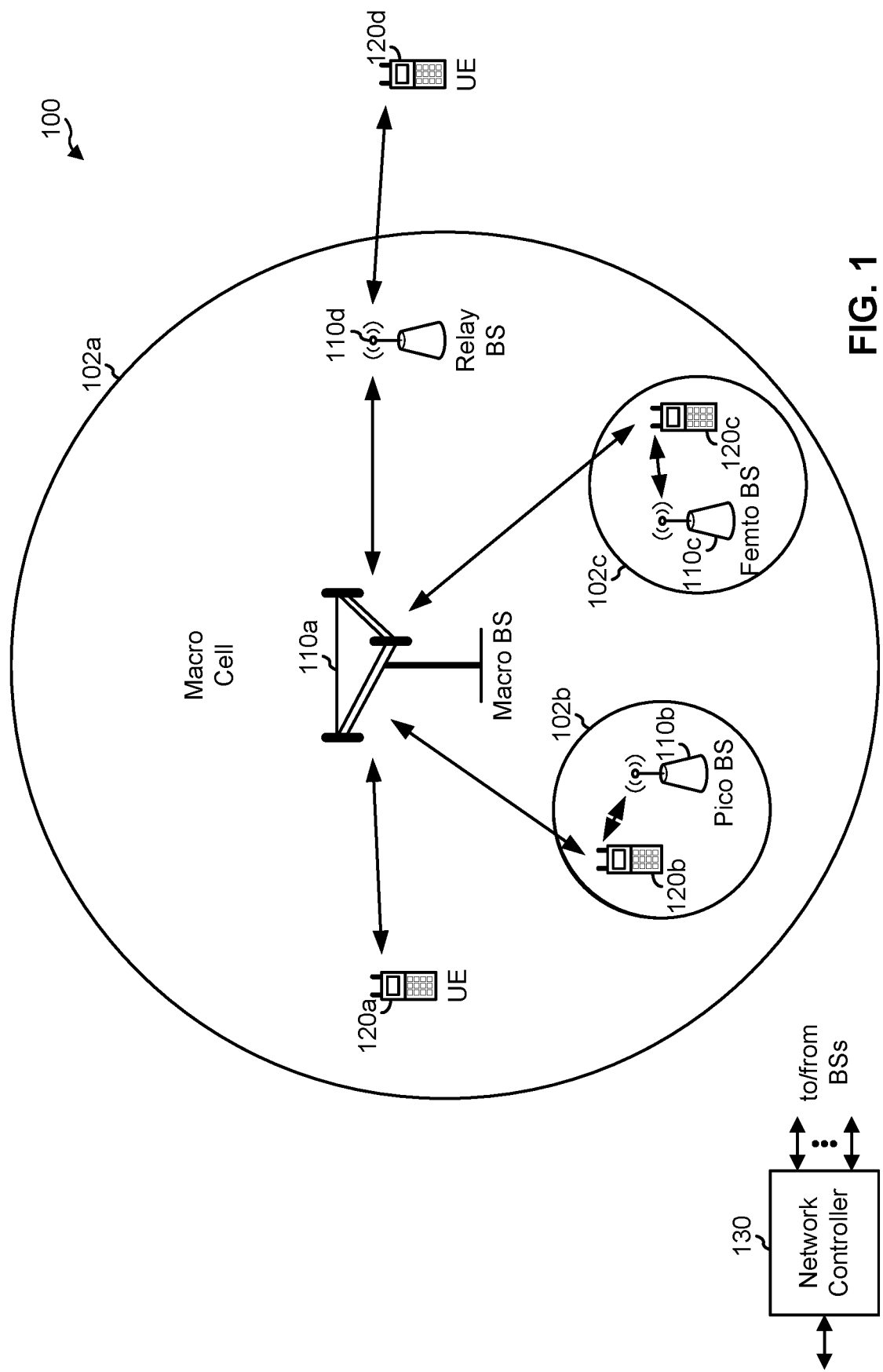
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of B Ss may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
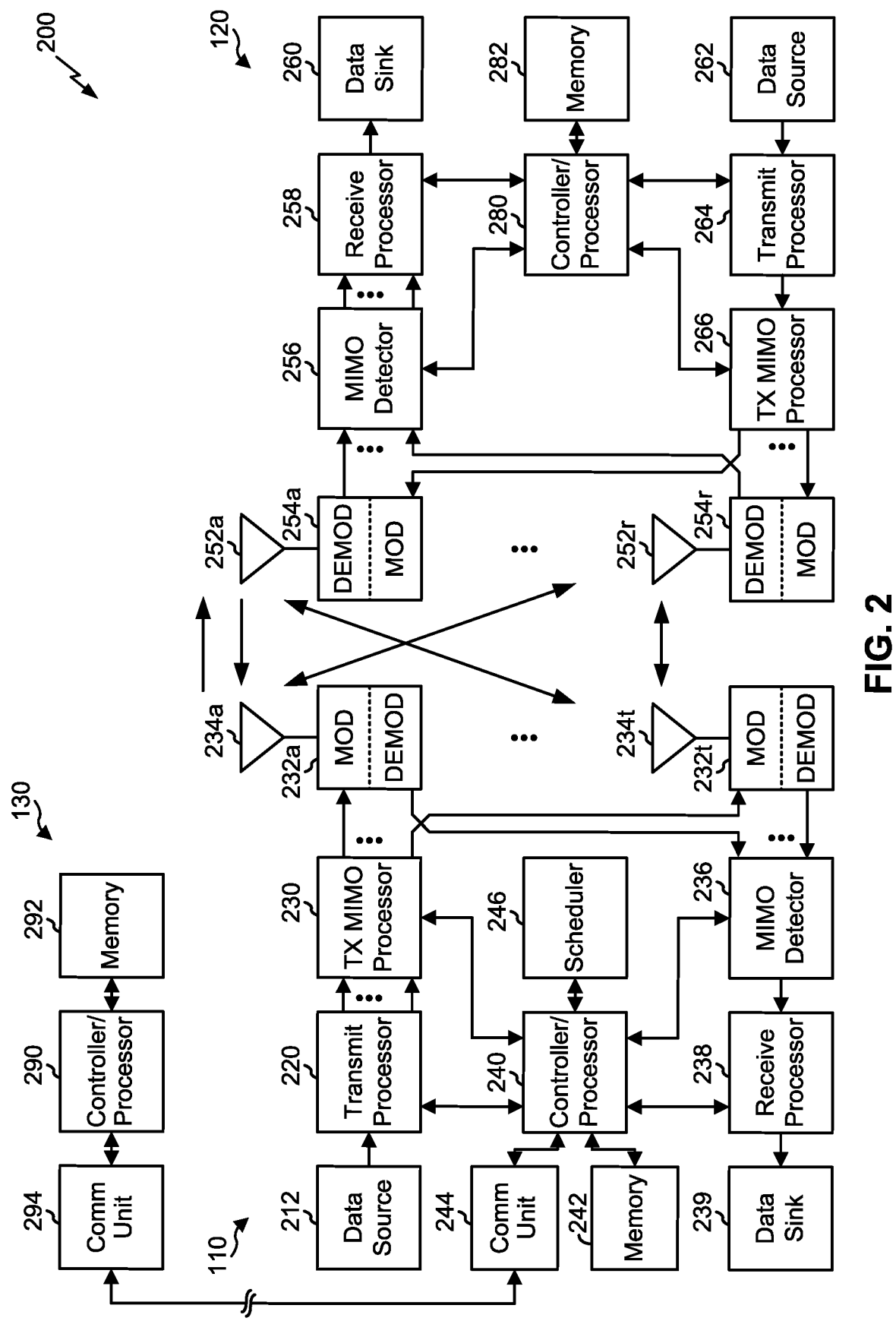
FIG. 2 is a block diagram conceptually illustrating an example of a base station in communication with a user equipment (UE) in a wireless communication network, in accordance with various aspects of the present disclosure.

FIG. 2 shows a block diagram of a design of BS 110 and UE 120, which may be one of the base stations and one of the UEs in FIG. 1. BS 110 may be equipped with T antennas 234*a* through 234*t*, and UE 120 may be equipped with R antennas 252*a* through 252*r*, where in general T>1 and R>1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

In some aspects, one or more components of UE 120 may be included in a housing. Controllers/processors 240 and 280 and/or any other component(s) in FIG. 2 may direct the operation at BS 110 and UE 120, respectively, to perform configuration of a variable timing adjust granularity. For example, controller/processor 280 and/or other processors and modules at UE 120 may perform or direct operations of UE 120 to perform configuration of a variable timing adjust granularity. For example, controller/processor 280 and/or other controllers/processors and modules at UE 120 may perform or direct operations of, for example, process 800 of FIG. 8 and/or other processes as described herein. In some aspects, one or more of the components shown in FIG. 2 may be employed to perform example process 800 and/or other processes for the techniques described herein. Memories 242 and 282 may store data and program codes for BS 110 and UE 120, respectively. A scheduler 246 may schedule UEs for data transmission on the downlink and/or uplink.

In some aspects, UE 120 may include means for determining at least one of a granularity or range of a timing adjustment value, means for performing timing adjustment based at least in part on at least one of the granularity or the range of the timing adjustment value, means for determining a delay for execution of the timing adjustment based at least in part on at least one of a numerology associated with UE 120, a carrier associated with UE 120, a band associated with UE 120, or a capability of UE 120, and/or the like. In some aspects, such means may include one or more components of UE 120 described in connection with FIG. 2.

As indicated above, FIG. 2 is provided merely as an example. Other examples are possible and may differ from what was described with regard to FIG. 2.

Figure 3:
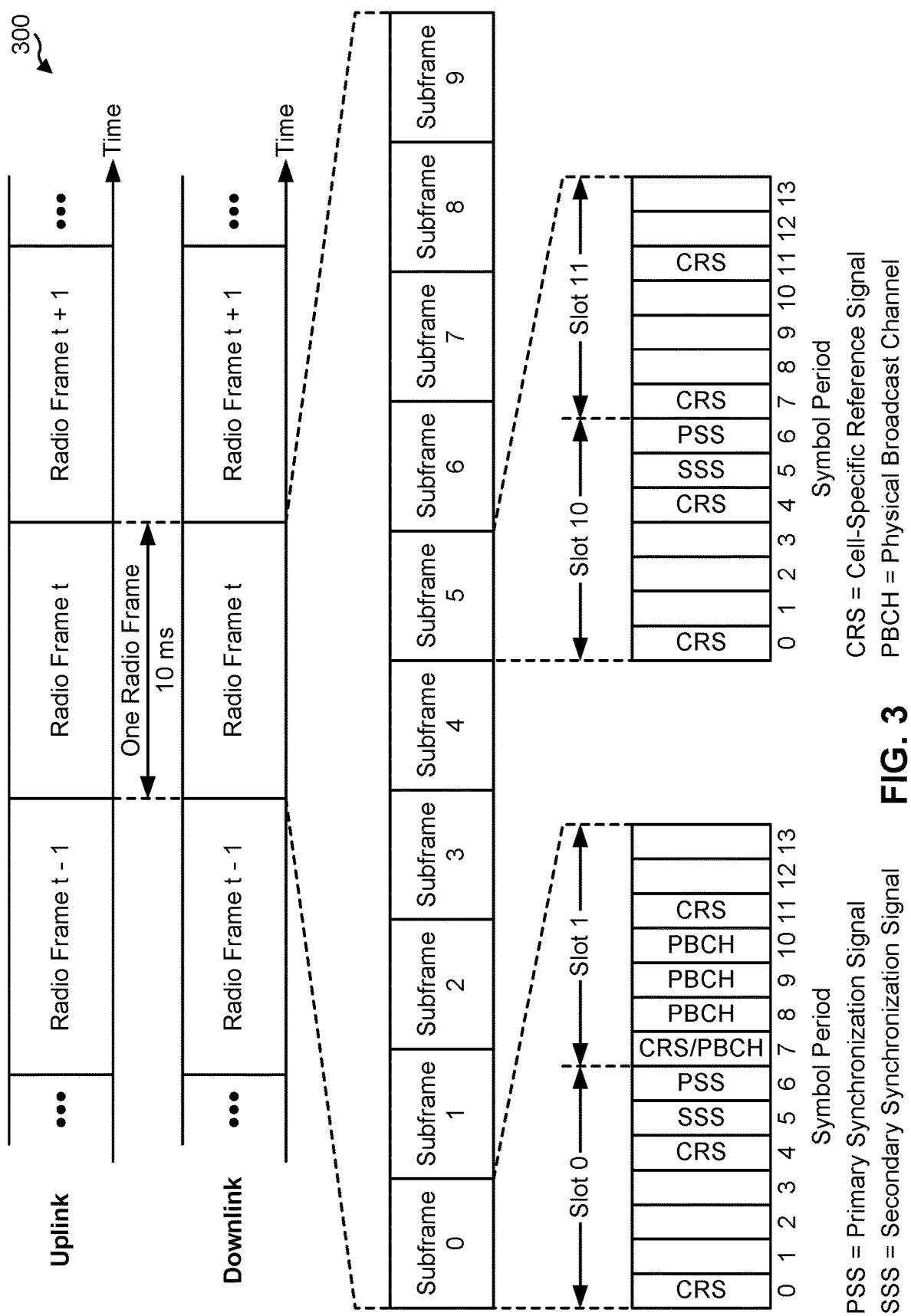
FIG. 3 is a block diagram conceptually illustrating an example of a frame structure in a wireless communication network, in accordance with various aspects of the present disclosure.

FIG. 3 shows an example frame structure 300 for frequency division duplexing (FDD) in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
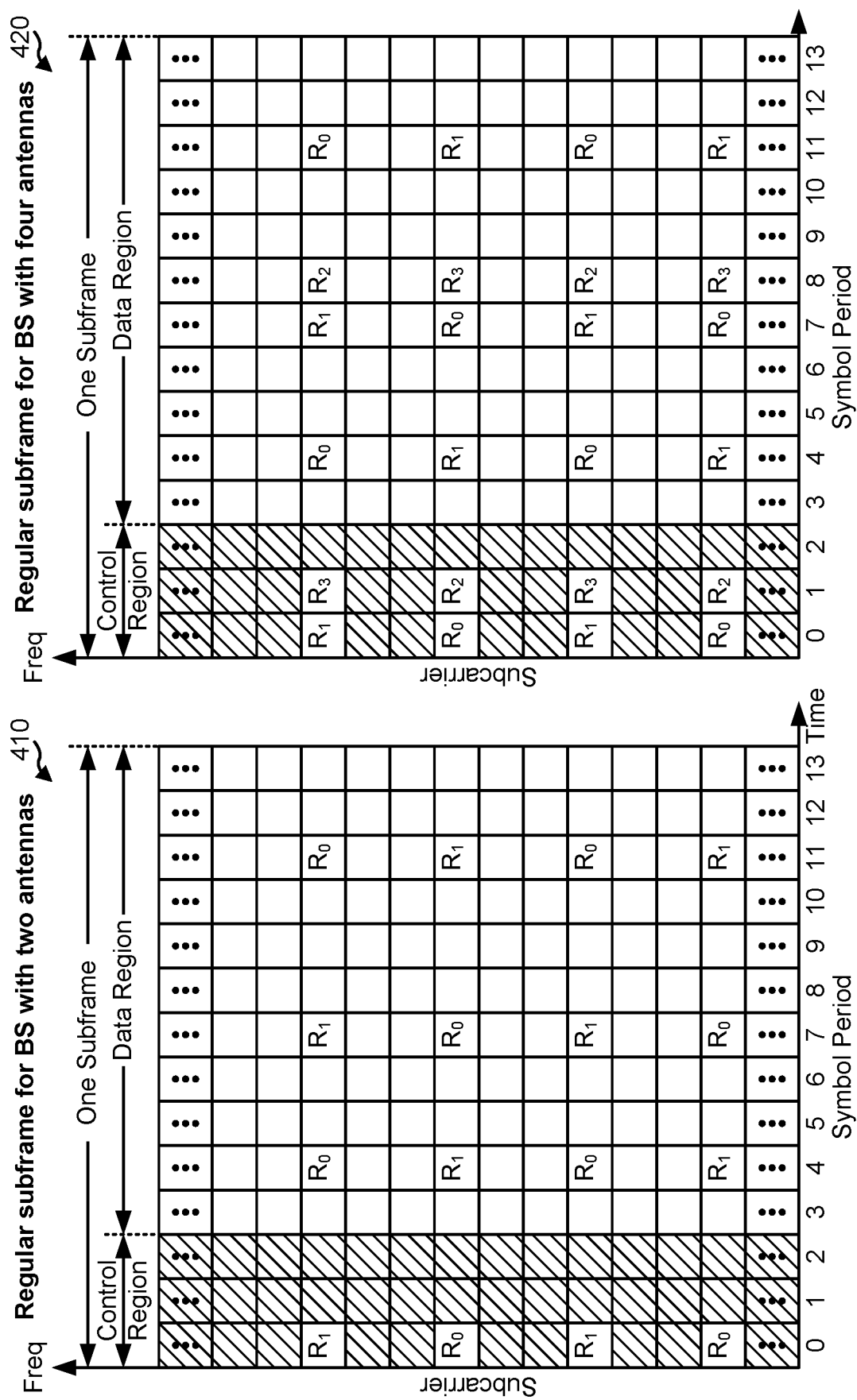
FIG. 4 is a block diagram conceptually illustrating two example subframe formats with the normal cyclic prefix, in accordance with various aspects of the present disclosure.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7, and 11. A reference signal is a signal that is known a priori by a transmitter and a receiver and may also be referred to as a pilot signal. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP Technical Specification (TS) 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q E {0, . . . , Q−1}.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include downlink/uplink (DL/UL) data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The radio access network (RAN) may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals. In some cases, DCells may transmit synchronization signals. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

A UE may use a timing adjustment (TA) procedure to apply a temporal offset to communications of the UE in order to overcome propagation delay and other types of delay, so that the communications of the UE are synchronized with those of other UEs when the communications arrive at a base station. In some aspects, timing adjustment is referred to as timing advance. The base station may configure TA by providing a TA command identifying an offset to be applied to the communications of the UE. This offset may be defined according to a fixed granularity in some RATs (e.g., LTE). For example, the granularity may be based at least in part on a tone spacing and system bandwidth of the UE, and thus may be fixed in a RAT wherein the tone spacing and system bandwidth are fixed. More particularly, and as an example, the granularity in LTE may be equal to 16 times a sample time of the UE, wherein the sample time is equal to 1/(15 kHZ*2048) seconds, wherein the 2048 value is based at least in part on a Fast Fourier Transform size of a 20 MHz system bandwidth.

However, 5G/NR may not have a fixed tone spacing and/or system bandwidth. Thus, a fixed TA may cause problems for certain UEs. As a particular example, a high tone-spacing is often associated with low cyclic-prefix (to avoid excessive cyclic-prefix overhead). In such a case, a fixed granularity (e.g., associated with LTE) may not be sufficient to align all UEs within the narrower cyclic-prefix. Additionally, or alternatively, UEs associated with a higher sampling rate may need a coarser granularity to properly account for TA values associated with large distances from a base station.

Some techniques and apparatuses, described herein, provide for adjustment of a TA granularity and/or delay. For example, some techniques and apparatuses described herein may provide for implicit or explicit signaling of a TA granularity to a UE, determination of a TA granularity by a UE, and/or the like. In this way, UEs associated with different sample times, tone spacing, and/or system bandwidth may achieve an approximately uniform time unit for TA. This may be beneficial because a TA offset to be applied may be dependent on mobility events and/or cell-radius, which may be consistent across UEs associated with different sample times, tone spacing, and/or system bandwidth. Thus, performance of TA is improved, thereby improving performance and/or capacity of the cellular network.

Figure 5:
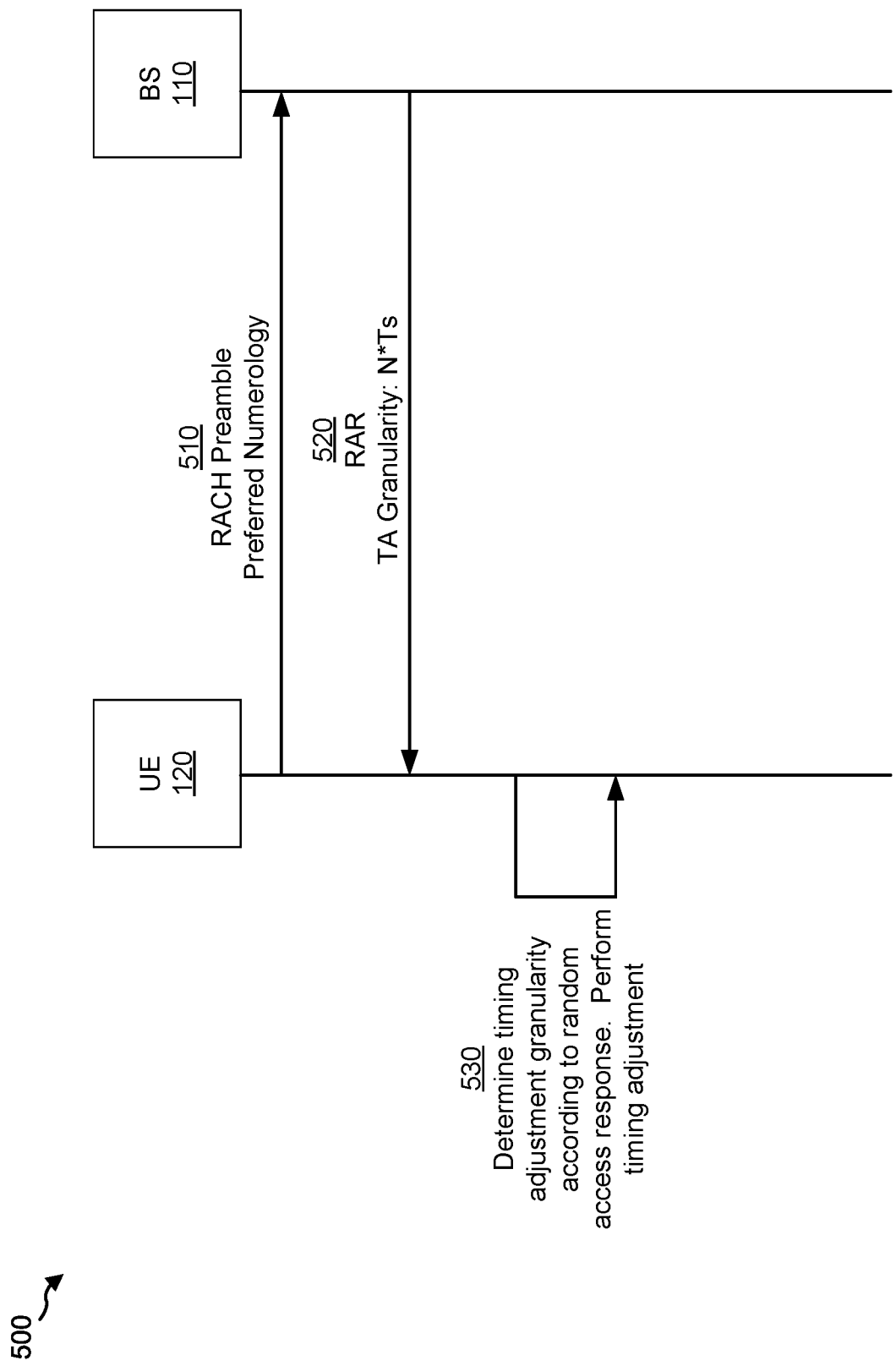
FIG. 5 is a diagram illustrating an example of configuring a variable timing adjustment granularity for New Radio, in accordance with various aspects of the present disclosure.

FIG. 5 is a diagram illustrating an example 500 of configuring a variable timing adjustment granularity for New Radio, in accordance with various aspects of the present disclosure. FIG. 5 is an example wherein TA for a UE 120 is configured during an initial access procedure of the UE 120.

As shown in FIG. 5, and by reference number 510, the UE 120 may provide a random access channel (RACH) preamble to a BS 110. As further shown, the RACH preamble may identify a preferred numerology. For example, the UE 120 may provide information indicating a preferred TA granularity, TA range, and/or TA delay (a delay between signaling of the TA command and application of the TA) to the BS 110. In some aspects, the information may be included in a physical RACH (PRACH) Message 1, and/or the like. In some aspects, for 4-step RACH, the information may be conveyed using a PRACH resource-space partition. For example, each partition may indicate one or more preferred numerologies, and the UE 120 may select a preamble in the partition based at least in part on a numerology associated with the partition. In some aspects, for 2-step RACH, the information may be conveyed in a payload of PRACH Message 1. The BS 110 may use the information to select a TA granularity, TA range, and/or TA delay for the UE 120.

As shown by reference number 520, the UE 120 may receive a random access response (RAR) from the BS 110. As further shown, the RAR may identify a TA granularity for the UE 120. The TA granularity may be defined based at least in part on a combination of a coefficient (e.g., N) and a sample time (e.g., Ts). In some aspects, the BS 110 may provide information indicating N, information indicating Ts, information indicating the product of N and Ts, and/or information indicating both N and Ts. The UE 120 may perform TA based at least in part on the TA granularity, as described in more detail below.

In some aspects, the UE 120 may receive or determine information identifying a range of values for TA. The range of values may correspond to a maximum possible cell radius. As an example, for LTE, the maximum possible cell radius may be approximately 100 km without a secondary cell group (SCG) or 20 km with an SCG. For 5G/NR, the maximum possible cell radius may be lower, especially in mm Wave and/or the like. In some aspects, the UE 120 may reuse an LTE range of values. In such a case, the UE 120 may tend to use a lower end of the range of values. In some aspects, the UE 120 may use a reduced range of values. This may reduce an amount of information needed to indicate the TA command. In some aspects, the UE 120 may use a same number of bits as an LTE TA command, and may interpret the TA command differently (e.g., according to a finer granularity). Thus, the TA range may be effectively reduced. In some aspects, the UE 120 may perform a combination of the above approaches. For example, the UE 120 may use a reduced number of bits and a finer granularity for the TA command.

In some aspects, the TA granularity may be preconfigured. For example, the UE 120 may receive a master information block (MIB), system information (e.g., minimum system information, remaining minimum system information (RMSI), etc.), and/or the like indicating the TA granularity. Additionally, or alternatively, the UE 120 may determine the TA granularity. For example, the UE 120 may determine the TA granularity based at least in part on a numerology of a recent uplink transmission (e.g., the RACH preamble, etc.), and/or the like.

As shown by reference number 530, the UE 120 may determine the TA granularity based at least in part on the RAR, and may perform TA based at least in part on the TA granularity. For example, the UE 120 may subsequently receive a TA command identifying a TA offset, may interpret the TA command according to the TA granularity, and may apply the TA offset accordingly. In this way, a variable TA granularity can be used for the UE 120.

As indicated above, FIG. 5 is provided as an example. Other examples are possible and may differ from what was described with respect to FIG. 5.

Figure 6:
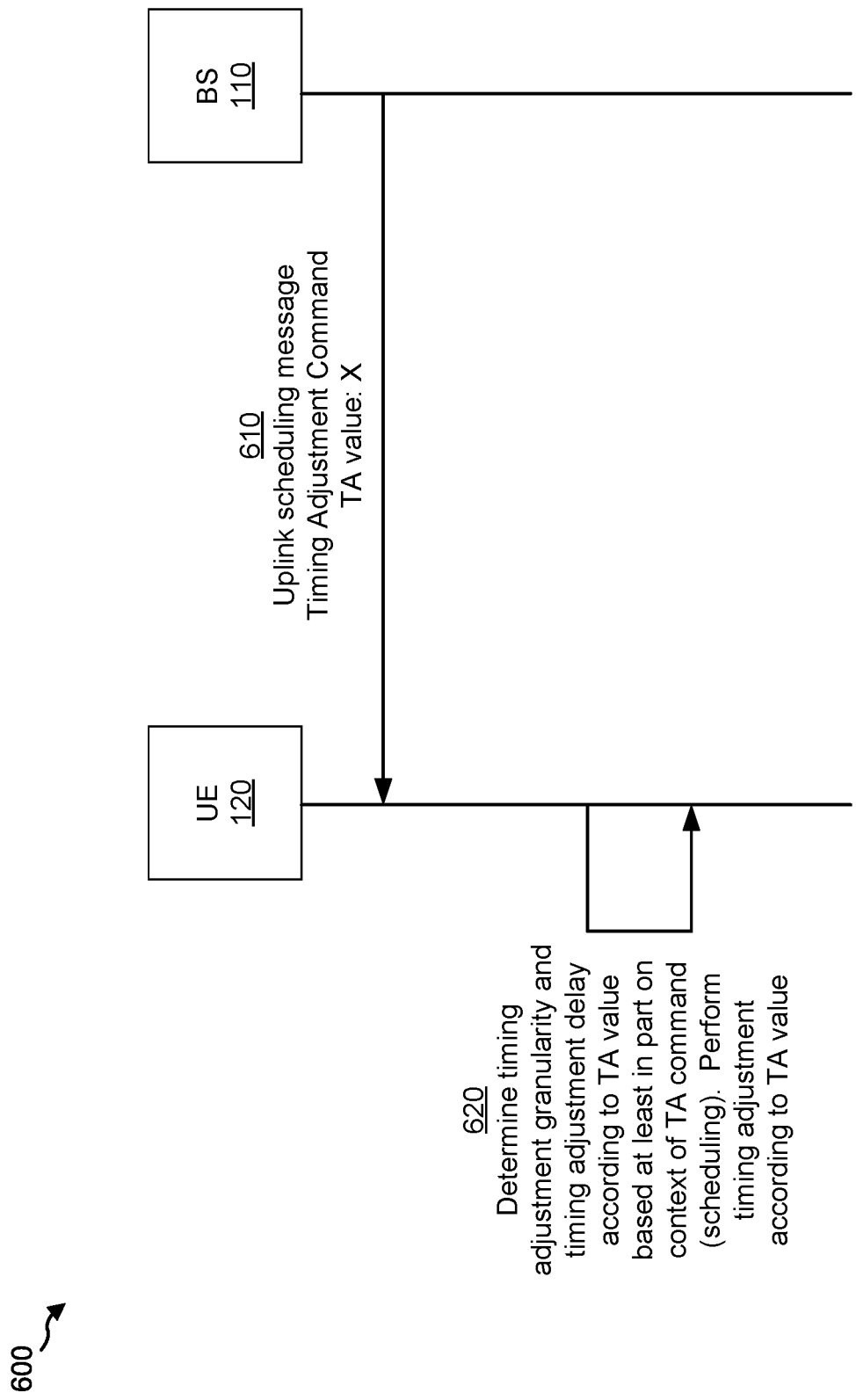
FIG. 6 is a diagram illustrating an example of configuring a variable timing adjustment granularity for New Radio, in accordance with various aspects of the present disclosure.

FIG. 6 is a diagram illustrating an example 600 of configuring a variable timing adjustment granularity for New Radio, in accordance with various aspects of the present disclosure. FIG. 6 is an example of TA granularity configuration after an initial access procedure has been performed.

As shown in FIG. 6, and by reference number 610, the UE 120 may receive an uplink scheduling message from the BS 110. As further shown, the uplink scheduling message may include a TA command. The TA command may indicate a TA offset (e.g., TA value X) to be applied to communications of the UE 120. For example, the TA command may indicate a particular value, and the UE 120 may interpret the particular value based at least in part on a TA granularity of the UE 120. In some aspects, the TA command may be included in a Media Access Control (MAC) control element (CE).

As shown by reference number 620, the UE 120 may determine the TA granularity for interpreting the TA command. In some aspects, the UE 120 may determine the TA granularity based at least in part on a context in which the TA command is received. For example, the UE 120 may determine the TA granularity based at least in part on a numerology of a message that carriers the TA command. Additionally, or alternatively, the UE 120 may determine the TA granularity based at least in part on a numerology of an uplink scheduling message for the TA command, such as the message shown by reference number 610. Additionally, or alternatively, the UE 120 may determine the TA granularity based at least in part on a numerology of a recent uplink transmission, such as a most recent physical uplink shared channel (PUSCH) transmission, a most recent physical uplink control channel (PUCCH) transmission, a most recent reference signal transmission, a most recent beam failure recovery request (BFRR) message, and/or the like. Additionally, or alternatively, the UE 120 may determine the TA granularity based at least in part on the TA command being included in a handover message from a target cell, based at least in part on the TA command being received during regular uplink/downlink scheduling, based at least in part on the TA command being received from the serving cell following an instruction to cause the UE 120 to perform a transmission for TA purposes, and/or the like.

In some aspects, the UE 120 may determine the TA granularity based at least in part on a most recent scheduled transmission, which reduces a likelihood of a misconfiguration of the TA granularity between the UE 120 and the BS 110. In some aspects, the UE 120 may determine the TA granularity based at least in part on a carrier or band associated with the UE 120, such as based at least in part on a system bandwidth of the carrier or band, a tone spacing of the carrier or band, and/or the like.

In some aspects, the TA granularity may be configured. For example, the UE 120 may receive configuration information indicating the TA granularity (e.g., a master information block (MIB), a system information block (SIB), radio resource control (RRC) messaging, a MAC-CE, downlink control information (DCI), a PDCCH, and/or the like). In some aspects, the TA command may indicate the TA granularity. For example, the TA command may indicate a value of N, a value of Ts, and/or a value of both N and Ts, as described in more detail above. In some aspects, the UE 120 may determine the TA granularity based at least in part on a combination of the above (e.g., configuration information, determination by the UE 120, and/or an indication in the TA command).

As further shown, the UE 120 may perform TA based at least in part on the TA granularity. For example, the UE 120 may receive a TA command indicating the TA value of X, and may interpret the value of X according to the TA granularity. In this way, the UE 120 performs TA based at least in part on a variable TA granularity, which improves performance of TA for UEs with variable tone spacing, system bandwidth, and/or the like.

As indicated above, FIG. 6 is provided as an example. Other examples are possible and may differ from what was described with respect to FIG. 6.

Figure 7:
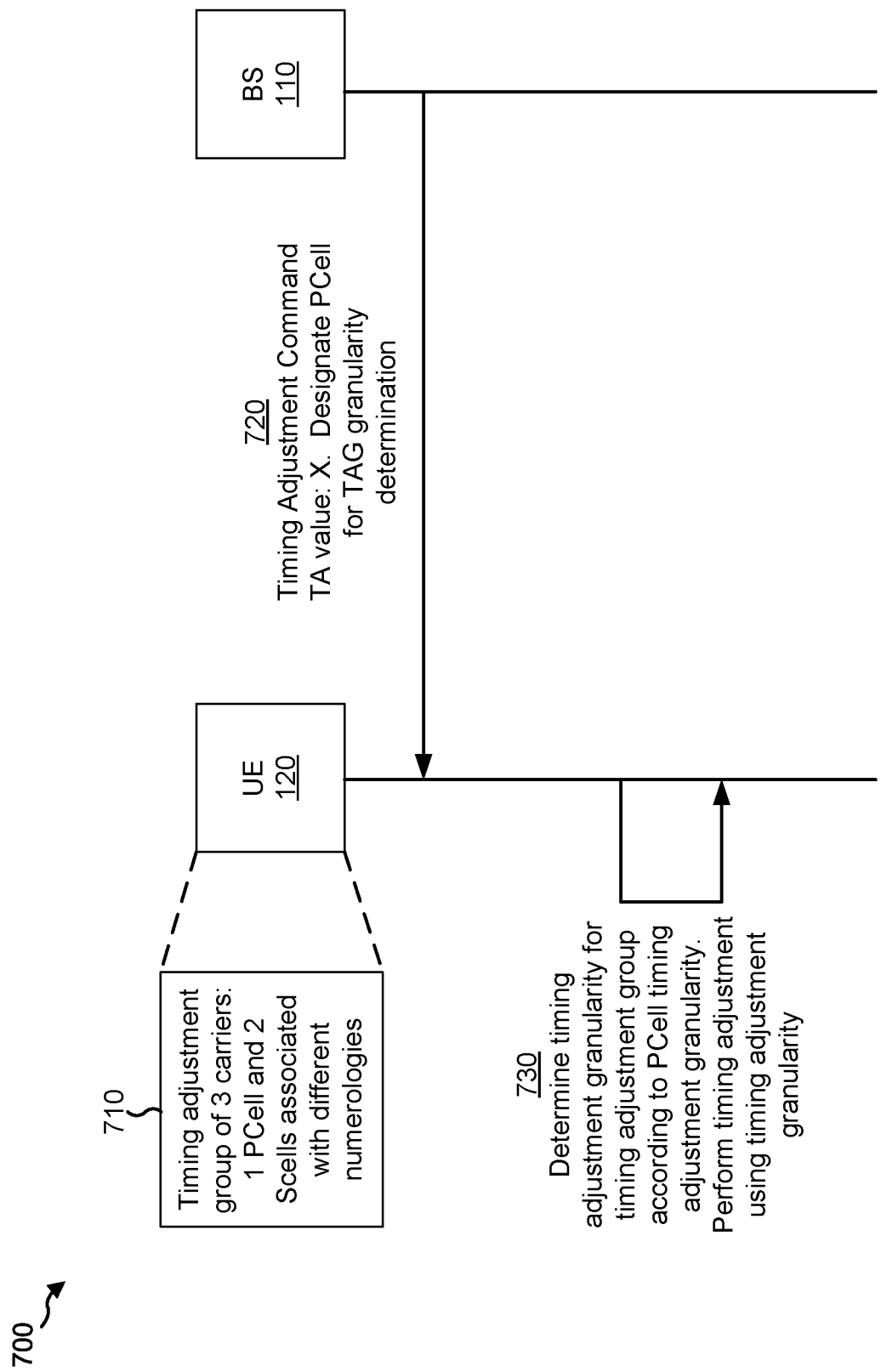
FIG. 7 is a diagram illustrating an example of configuring a variable timing adjustment granularity for New Radio, in accordance with various aspects of the present disclosure.

FIG. 7 is a diagram illustrating an example of configuring a variable timing adjustment granularity for New Radio, in accordance with various aspects of the present disclosure. FIG. 7 is an example relating to determination of a TA granularity for a carrier aggregation (CA) or dual-connectivity (DC) UE 120.

As shown in FIG. 7, and by reference number 710, the UE 120 may be associated with a group of 3 carriers, which may be referred to herein as a timing adjustment group (TAG). As further shown, the TAG may include a primary cell (PCell) and two secondary cells (SCells). As shown, each of the three carriers may be associated with a different numerology (e.g., tone spacing and/or system bandwidth).

As shown by reference number 720, the UE 120 may receive a TA command indicating a TA value X. As further shown, the TA command may designate the PCell for determination of the TA granularity for the TAG. For example, in some aspects, the TA command may designate a particular carrier or cell of the TAG, and the UE 120 may use a numerology associated with the particular carrier or cell to determine a TA granularity. In some aspects, the particular carrier or cell may be designated using a MIB, a minimum system information block (MSIB), an other system information block (OSIB), RRC messaging, DCI, a group-common DCI, a MAC-CE, and/or the like.

As shown by reference number 730, the UE 120 may determine the TA granularity for the TAG based at least in part on a numerology of the PCell, and may perform TA according to the TA granularity. For example, the UE 120 may use a same TA granularity for the entire TAG, which simplifies execution of TA. In some aspects, the UE 120 may automatically determine the TA granularity based at least in part on a PCell numerology or a PSCell numerology (e.g., when the TAG includes a PCell or a PSCell).

As a particular example, the TA granularity may be based at least in part on the following equation:
wherein $\mu$ is a subcarrier spacing of the UE 120. $T_c$ is a constant, wherein $T=1/(\Delta f_{max} \cdot N_f)$ where $\Delta f_{max}=480 \cdot 10^3$ Hz and $N_f=4096$. Thus, the TA granularity may be based at least in part on the numerology of the UE 120, which is related to the subcarrier spacing. The TA command for a TAG may indicate the change of uplink timing relative to a current uplink timing of the TAG as a multiple of the above equation.

In some aspects, the UE 120 may use different TA granularities for different cells or carriers. For example, the determination of respective TA granularities for a TAG may be based at least in part on respective parameters of the cells or carriers of the TAG, such as numerology, bandwidth, tone spacing, and/or the like. In some aspects, the UE 120 may use a combination of the above approaches to determine TA granularity for a TAG. For example, the UE 120 may use a per-carrier interpretation, but only for TAGs that do not include a PCell or PSCell. When a TAG includes a PCell or PSCell, the UE 120 may determine the TA granularity for the TAG based at least in part on the PCell or PSCell.

In some aspects, a UE 120 may determine a delay for execution of TA. For example, in LTE, a TA command received in subframe B may be executed in subframe B+6. In 5G/NR, a more flexible approach may be used, wherein the UE 120 determines the delay. For example, the UE 120 may receive configuration information indicating the delay (e.g., MIB, MSIB, OSIB, RRC, MAC-CE, DCI, group-common DCI, PDCCH, etc.). Additionally, or alternatively, the delay may be indicated in the TA command. Additionally, or alternatively, the UE 120 may determine the delay based at least in part on a numerology of the UE 120, a carrier of the UE 120, a band of the UE 120, a capability of the UE 120, and/or a combination of the above.

In some aspects, the TA procedure may be associated with an accuracy requirement or performance requirement, which is sometimes referred to herein as a performance parameter. For example, in LTE, at a TA granularity of 16*Ts, an accuracy requirement of 4*Ts may apply for a TS command, and an accuracy requirement of 24*Ts (for sub-1.4 MHz bands) or 12*Ts (for 3 MHz and greater bands) may apply. In 5G/NR, a more flexible approach may be used. For example, the accuracy requirement may be defined as a fixed fraction of the TA granularity (e.g., ¼ of the TA granularity, ⅛ of the TA granularity, and/or the like). Additionally, or alternatively, the accuracy requirement may be defined as a function of another parameter, such as numerology, band, carrier, bandwidth, tone spacing, and/or the like. By using a variable accuracy requirement, the UE 120 may improve performance of the TA procedure.

As indicated above, FIG. 7 is provided as an example. Other examples are possible and may differ from what was described with respect to FIG. 7.

Figure 8:
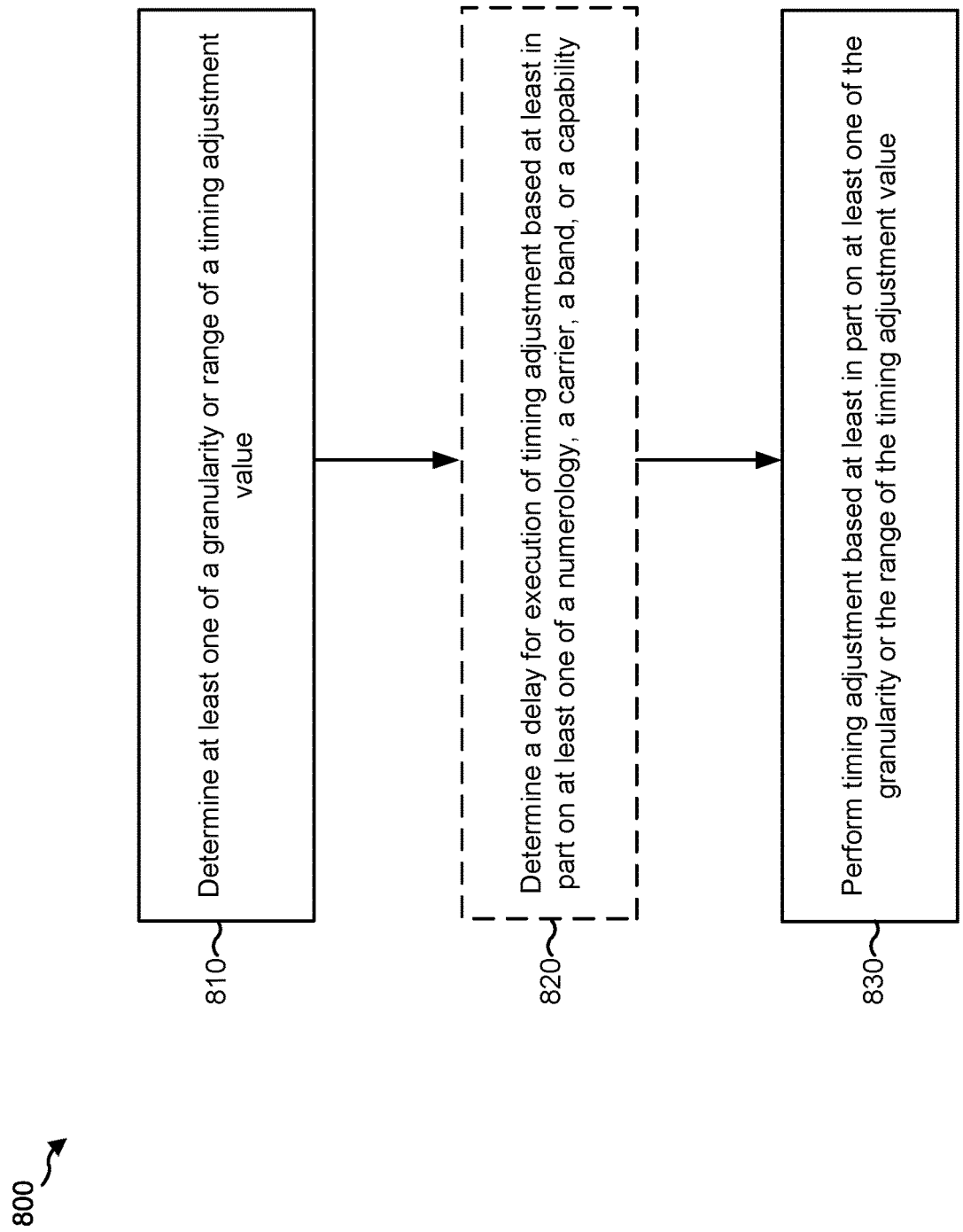
FIG. 8 is a diagram illustrating an example process performed, for example, by a user equipment, in accordance with various aspects of the present disclosure.

FIG. 8 is a diagram illustrating an example process 800 performed, for example, by a user equipment, in accordance with various aspects of the present disclosure. Example process 800 is an example where a user equipment (e.g., UE 120) performs configuration of a variable timing adjustment granularity for New Radio.

As shown in FIG. 8, in some aspects, process 800 may include determining at least one of a granularity or range of a timing adjustment value (block 810). For example, the user equipment (e.g., using controller/processor 280 and/or the like) may determine at least one of a TA granularity or a range of a TA value. In some aspects, the user equipment may perform the determination based at least in part on at least one of a TA command, configuration information, information regarding a communication, carrier, or band associated with the user equipment, or a combination thereof. In some aspects, the granularity or the range may be variable based at least in part on the communication, carrier, or band associated with the user equipment.

As shown in FIG. 8, in some aspects, process 800 may optionally include determining a delay for execution of timing adjustment based at least in part on at least one of a numerology, a carrier, a band, or a capability (block 820). For example, in some aspects, the user equipment (e.g., using controller/processor 280 and/or the like) may determine a delay for execution of the timing adjustment. The determination may be based at least in part on a numerology of the user equipment, a carrier of the user equipment, a band of the user equipment, or a UE capability of the user equipment.

As shown in FIG. 8, in some aspects, process 800 may include performing timing adjustment based at least in part on at least one of the granularity or the range of the timing adjustment value (block 830). For example, the user equipment (e.g., using controller/processor 280, transmit processor 264, TX MIMO processor 266, MOD 254, antenna 252, and/or the like) may perform TA (e.g., a TA procedure) based at least in part on at least one of the granularity or the range of the TA value. In some aspects, the user equipment may interpret the TA value according to the granularity and/or the range to determine a TA offset, and may apply the TA offset to communications of the user equipment after the delay has elapsed. In some aspects, the user equipment may perform the timing adjustment based at least in part on a timing adjustment command, configuration information regarding the granularity, information regarding a communication, carrier, or band associated with the user equipment, or a combination thereof.

Process 800 may include additional aspects, such as any single aspect or any combination of aspects described below and/or in connection with one or more other processes described elsewhere herein.

In some aspects, the timing adjustment command indicates at least one of a value of a coefficient for determining the timing adjustment value, the sample time of the user equipment, or a combination of the sample time and the value of the coefficient.

In some aspects, the configuration information includes at least one of a master information block, a system information block, radio resource control (RRC) information, a media access control control element (MAC-CE), downlink control information (DCI), a group-common DCI, or a physical downlink control channel.

In some aspects, the information regarding the communication, carrier, or band associated with the user equipment includes at least one of a numerology of a downlink shared channel that provides the timing adjustment command, a numerology of a downlink control channel that schedules the downlink shared channel, a numerology of an uplink transmission of the user equipment, or a numerology of a scheduled uplink transmission of the user equipment.

In some aspects, the determination is based at least in part on a context in which the timing adjustment command is received. In some aspects, the determination is based at least in part on whether the timing adjustment command is received in a handover message. For example, in some aspects, the determination is based at least in part on whether the timing adjustment command is received from a serving cell of the user equipment during data scheduling. For example, in some aspects, the determination is based at least in part on whether the timing adjustment command is received from a serving cell in association with an instruction to cause the user equipment to perform an uplink transmission for timing adjustment purposes.

In some aspects, the timing adjustment is performed after an initial access procedure is performed. In some aspects, the timing adjustment is performed during an initial access procedure of the user equipment. In some aspects, the configuration information includes at least one of a master information block (MIB) or a remaining minimum system information (RMSI). In some aspects, the information regarding the communication, carrier, or band associated with the user equipment relates to a random access message transmitted by the user equipment. In some aspects, the random access message indicates a preferred numerology of the user equipment. In some aspects, the preferred numerology is indicated using a random access channel resource-space partition. In some aspects, the preferred numerology is indicated in a payload sent with an initial RACH message.

In some aspects, the timing adjustment is performed for a timing adjustment group (TAG) that share the timing adjustment command. In some aspects, the TAG includes a primary cell (PCell) or a primary secondary cell (PSCell), and a numerology of the PCell or the PSCell is used to determine the granularity of the timing adjustment value of the TAG. In some aspects, a particular cell of the TAG is designated, using the configuration information, for determination of the granularity of the timing adjustment value of the TAG. In some aspects, the timing adjustment command is interpreted differently for a first cell of the TAG than for a second cell of the TAG based at least in part on respective numerologies of the first cell and the second cell.

In some aspects, the configuration information further indicates a delay for execution of the timing adjustment. In some aspects, the timing adjustment command indicates a delay for execution of the timing adjustment. In some aspects, the user equipment may determine a delay for execution of the timing adjustment based at least in part on at least one of a numerology associated with the user equipment, a carrier associated with the user equipment, a band associated with the user equipment, or a capability of the user equipment.

In some aspects, a performance parameter (e.g., an accuracy requirement, a performance requirement, etc.) for the timing adjustment is based at least in part on a particular fraction of the granularity of the timing adjustment. In some aspects, a performance parameter for the timing adjustment is based at least in part on at least one of the granularity of the timing adjustment, a numerology associated with the user equipment, a carrier associated with the user equipment, a band associated with the user equipment, or a capability of the user equipment.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a timing adjustment command that indicates a value for timing adjustment; and
   performing a timing adjustment based at least in part on a timing adjustment offset,
   wherein the timing adjustment offset is based at least in part on the value for timing adjustment and a granularity, and
   wherein the granularity is based at least in part on a numerology associated with the UE.

2. The method of claim 1, wherein the numerology, on which the granularity is based, is a numerology of an uplink transmission of the UE.

3. The method of claim 1, wherein the timing adjustment is performed for a timing adjustment group (TAG) that shares the timing adjustment command.

4. The method of claim 3, wherein the numerology, on which the granularity is based, is a numerology associated with a designated carrier of the TAG.

5. The method of claim 1, wherein the timing adjustment is performed after an initial access procedure is performed.

6. The method of claim 1, wherein the timing adjustment is performed based at least in part on receiving a random access response (RAR).

7. The method of claim 1, wherein the timing adjustment is performed after a delay that is based at least in part on the numerology,
   wherein the delay is between signaling of the timing adjustment command and application of the timing adjustment.

8. The method of claim 1, wherein the timing adjustment is performed after a delay that is based at least in part on a capability of the UE,
   wherein the delay is between signaling of the timing adjustment command and application of the timing adjustment.

9. A user equipment (UE) for wireless communication, comprising:
   a memory; and
   one or more processors coupled to the memory and configured to:
      receive a timing adjustment command that indicates a value for timing adjustment; and
      perform a timing adjustment based at least in part on a timing adjustment offset,
      wherein the timing adjustment offset is based at least in part on the value for timing adjustment and a granularity, and wherein the granularity is based at least in part on a numerology associated with the UE.

10. The UE of claim 9, wherein the numerology, on which the granularity is based, is a numerology of an uplink transmission of the UE.

11. The UE of claim 9, wherein the timing adjustment is performed for a timing adjustment group (TAG) that shares the timing adjustment command.

12. The UE of claim 11, wherein the numerology, on which the granularity is based, is a numerology associated with a designated carrier of the TAG.

13. The UE of claim 9, wherein the timing adjustment is performed after an initial access procedure is performed.

14. The UE of claim 9, wherein the timing adjustment is performed based at least in part on receiving a random access response (RAR).

15. The UE of claim 9, wherein the timing adjustment is performed after a delay that is based at least in part on the numerology,
wherein the delay is between signaling of the timing adjustment command and application of the timing adjustment.

16. The UE of claim 9, wherein the timing adjustment is performed after a delay that is based at least in part on a capability of the UE,
wherein the delay is between signaling of the timing adjustment command and application of the timing adjustment.

17. A non-transitory computer-readable medium storing one or more instructions for wireless communication, the one or more instructions comprising:
one or more instructions that, when executed by one or more processors of a user equipment (UE), cause the one or more processors to:
receive a timing adjustment command that indicates a value for timing adjustment; and
perform a timing adjustment based at least in part on a timing adjustment offset,
wherein the timing adjustment offset is based at least in part on the value for timing adjustment and a granularity, and
wherein the granularity is based at least in part on a numerology associated with the UE.

18. The non-transitory computer-readable medium of claim 17, wherein the numerology, on which the granularity is based, is a numerology of an uplink transmission of the UE.

19. The non-transitory computer-readable medium of claim 17, wherein the timing adjustment is performed for a timing adjustment group (TAG) that shares the timing adjustment command.

20. The non-transitory computer-readable medium of claim 17, wherein the timing adjustment is performed after an initial access procedure is performed.

21. The non-transitory computer-readable medium of claim 17, wherein the timing adjustment is performed based at least in part on receiving a random access response (RAR).

22. The non-transitory computer-readable medium of claim 17, wherein the timing adjustment is performed after a delay that is based at least in part on the numerology,
wherein the delay is between signaling of the timing adjustment command and application of the timing adjustment.

23. The non-transitory computer-readable medium of claim 17, wherein the timing adjustment is performed after a delay that is based at least in part on a capability of the UE,
wherein the delay is between signaling of the timing adjustment command and application of the timing adjustment.

24. An apparatus for wireless communication, comprising:
means for receiving a timing adjustment command that indicates a value for timing adjustment; and
means for performing a timing adjustment based at least in part on a timing adjustment offset,
wherein the timing adjustment offset is based at least in part on the value for timing adjustment and a granularity, and
wherein the granularity is based at least in part on a numerology associated with the apparatus.

25. The apparatus of claim 24, wherein the numerology, on which the granularity is based, is a numerology of an uplink transmission of the apparatus.

26. The apparatus of claim 24, wherein the timing adjustment is performed for a timing adjustment group (TAG) that shares the timing adjustment command.

27. The apparatus of claim 24, wherein the timing adjustment is performed after an initial access procedure is performed.

28. The apparatus of claim 24, wherein the timing adjustment is performed based at least in part on receiving a random access response (RAR).

29. The apparatus of claim 24, wherein the timing adjustment is performed after a delay that is based at least in part on the numerology,
wherein the delay is between signaling of the timing adjustment command and application of the timing adjustment.

30. The apparatus of claim 24, wherein the timing adjustment is performed after a delay that is based at least in part on a capability of the apparatus,
wherein the delay is between signaling of the timing adjustment command and application of the timing adjustment.

31. A method of wireless communication performed by a user equipment (UE), the method comprising:
determining a respective granularity of a timing adjustment value for each of a plurality of carriers based at least in part on a timing adjustment command indicating the timing adjustment value for a timing adjustment group (TAG) of the carriers that share the timing adjustment command, wherein the respective granularity is variable based at least in part on a numerology associated with a cell of the TAG; and
performing timing adjustment based at least in part on the respective granularity of the timing adjustment value, wherein the timing adjustment command is interpreted differently for a first cell of the TAG than for a second cell of the TAG based at least in part on respective numerologies of the first cell and the second cell.

32. A user equipment (UE) for wireless communication, comprising:
a memory; and
one or more processors coupled to the memory and configured to:
determine a respective granularity of a timing adjustment value for each of a plurality of carriers based at least in part on a timing adjustment command indicating the timing adjustment value for a timing adjustment group (TAG) of the carriers that share the timing adjustment command, wherein the respective granularity is variable based at least in part on a numerology associated with a cell of the TAG; and perform timing adjustment based at least in part on the respective granularity of the timing adjustment value, wherein the timing adjustment command is interpreted differently for a first cell of the TAG than for a second cell of the TAG based at least in part on respective numerologies of the first cell and the second cell.

* * * * *